(12) United States Patent
Liu et al.

(10) Patent No.: US 9,650,545 B2
(45) Date of Patent: May 16, 2017

(54) SELF-ADHESIVE LAMINATE AND METHOD OF MAKING IT

(71) Applicant: Wilsonart LLC, Temple, TX (US)

(72) Inventors: Wen-Feng Liu, Naperville, IL (US); James W. Stone, Northbrook, IL (US); Donald P. Schaefer, Ansbach (DE); Lutz H. Reitzel, Gross-Zimmern (DE)

(73) Assignee: Wilsonart LLC, Temple, TX (US)

( * ) Notice: Subject to any disclaimer, the term of this patent is extended or adjusted under 35 U.S.C. 154(b) by 662 days.

(21) Appl. No.: 13/690,152

(22) Filed: Nov. 30, 2012

(65) Prior Publication Data
US 2013/0089689 A1    Apr. 11, 2013

Related U.S. Application Data

(63) Continuation of application No. 11/272,991, filed on Nov. 14, 2005, now abandoned.
(Continued)

(51) Int. Cl.
*C09J 7/02* (2006.01)
*B32B 37/12* (2006.01)
(Continued)

(52) U.S. Cl.
CPC ........ *C09J 7/02* (2013.01); *B32B 7/12* (2013.01); *B32B 21/04* (2013.01); *B32B 37/1284* (2013.01); *B44C 1/105* (2013.01); *B44C 5/0469* (2013.01); *C09J 7/0203* (2013.01); *C09J 7/0217* (2013.01); *C09J 7/0246* (2013.01); *C09J 7/0296* (2013.01); *C09J 2201/36* (2013.01);
(Continued)

(58) Field of Classification Search
None
See application file for complete search history.

(56) References Cited

U.S. PATENT DOCUMENTS 2,804,416 A    8/1957   Phillipsen
3,239,478 A    3/1966   Harlan, Jr.
(Continued)

FOREIGN PATENT DOCUMENTS

EP    0 537 115 A1    4/1993
WO    WO 94/00526    1/1994
(Continued)

OTHER PUBLICATIONS

Harrington (Handbook of Adhesive Technology, Second Edition, Chapter 24: Elastomeric Adhesives, Taylor & Francis, 2003).*
(Continued)

*Primary Examiner* — Alexandre Ferre
(74) *Attorney, Agent, or Firm* — Maxwell J. Petersen; Lewis Brisbois Bisgaard & Smith (57) ABSTRACT

A decorative laminate includes a laminate substrate coated with an adhesive layer. The adhesive layer is a layer of a physically setting, solvent-free adhesive material including an acrylic polymer. The adhesive layer is self-adhesive at room temperature. The adhesive-coated laminate substrate has a peeling-off force of at least 0.2 N/mm$^2$, after application on a carrier. A method for the production of the adhesive-coated laminate substrate, its use as a coating material, and a composite of the adhesive-coated laminate substrate and a carrier material are also provided.

16 Claims, 1 Drawing Sheet

Related U.S. Application Data (60) Provisional application No. 60/652,257, filed on Feb. 11, 2005.

(51) Int. Cl.
*B32B 7/12* (2006.01)
*B32B 21/04* (2006.01)
*B44C 1/10* (2006.01)
*B44C 5/04* (2006.01)

(52) U.S. Cl.
CPC .......... *C09J 2433/00* (2013.01); *Y10T 428/14* (2015.01); *Y10T 428/1438* (2015.01); *Y10T 428/1452* (2015.01)

(56) References Cited

U.S. PATENT DOCUMENTS

| | | | |
|---|---|---|---|
| 3,427,269 A | 2/1969 | Davis et al. | |
| 3,700,633 A | 10/1972 | Wald et al. | |
| 3,701,711 A | 10/1972 | Kelly | |
| 3,753,936 A | 8/1973 | Marrs | |
| 3,932,327 A | 1/1976 | Naylor | |
| 4,083,744 A | 4/1978 | Degens | |
| 4,158,712 A | 6/1979 | Degens | |
| 4,169,822 A * | 10/1979 | Kutch et al. | 523/450 |
| 4,543,290 A * | 9/1985 | Brooker et al. | 428/336 |
| 4,835,200 A * | 5/1989 | St. Clair | 524/100 |
| 4,849,278 A | 7/1989 | Stokes | |
| 5,073,457 A | 12/1991 | Blackwell | |
| 5,256,427 A | 10/1993 | Quick et al. | |
| 5,670,226 A | 9/1997 | Yoshizawa et al. | |
| 5,993,961 A | 11/1999 | Ugolick et al. | |
| 6,030,705 A | 2/2000 | Buoniconti et al. | |
| 6,093,473 A | 7/2000 | Min | |
| 6,143,818 A | 11/2000 | Wang et al. | |
| 6,174,634 B1 | 1/2001 | De Bastiani | |
| 6,375,788 B1 | 4/2002 | Ma et al. | |
| 6,475,616 B1 | 11/2002 | Dietz et al. | |
| 6,613,381 B1 * | 9/2003 | Bredahl et al. | 427/207.1 |
| 6,808,587 B2 | 10/2004 | Böhm et al. | |
| 6,866,928 B2 | 3/2005 | Narum et al. | |
| 2002/0094404 A1 | 7/2002 | Schottenfeld | |
| 2002/0127361 A1 | 9/2002 | Sandt et al. | |
| 2002/0142158 A1 | 10/2002 | Ono et al. | |
| 2003/0008137 A1 | 1/2003 | Bohm et al. | |
| 2003/0129361 A1 * | 7/2003 | Plug et al. | 428/172 |
| 2004/0091694 A1 | 5/2004 | Holzer et al. | |
| 2004/0258936 A1 | 12/2004 | Yamaguchi et al. | |
| 2005/0069698 A1 | 3/2005 | Eubanks et al. | |
| 2005/0153113 A1 | 7/2005 | Hseih et al. | |
| 2006/0062955 A1 | 3/2006 | Liu et al. | |

FOREIGN PATENT DOCUMENTS

| | | |
|---|---|---|
| WO | WO 98/56866 | 12/1998 |
| WO | WO 02/47906 A1 | 6/2002 |
| WO | WO 2005/016663 A1 | 2/2005 |

OTHER PUBLICATIONS http://www.thermopal.de/files/pdf/HPL_Deutsch_1.pdf, German language product information brochure for Brilliant-HPL and Brilliant-Duplo, printed Jun. 21, 2006 (3 pages).
www.thermopal.com, Thermopal press release Sep. 2005, including product information, Leutkirch, Germany, printed Jun. 21, 2006 (2 pages).
Ullmann's Encyclopedia of Industrial Chemistry, 4th Edition, vol. 15 p. 326, 1972-1984 (1 page).
European Standard: EN-438 parts 1-6, High Pressure Laminates (HPL), Jan. 2005, European Committee for Standardization, Brussels, Belgium (116 pages).
International Standard: ISO 4586 parts 1-2, High-Pressure Decorative Laminates—Sheets Made From Thermosetting Resins, Fifth Edition, Oct. 15, 2004, ISO Copyright Office, Switzerland (85 pages).
Ullman's Encyclopedia of Industrial Chemistry, 4th Edition, vol. 15, pp. 234-238.
Ullman's Encyclopedia of Industrial Chemistry, 4th Edition, vol. 14, pp. 227-242.

* cited by examiner

SELF-ADHESIVE LAMINATE AND METHOD OF MAKING IT

CROSS REFERENCE TO RELATED APPLICATION

This application is a continuation of U.S. patent application Ser. No. 11/272,991, filed on 14 Nov. 2005, which in turn claims priority under 35 U.S.C. §119(e) to U.S. Provisional Patent Application 60/652,257, filed on 11 Feb. 2005, and which also claims priority under 35 U.S.C. §120 as a continuation of International Patent Application PCT/EP2004/009001, filed 12 Aug. 2004. International Patent PCT/EP2004/009001 in turn claims priority based on German Application DE 2003 103 7531, filed 14 Aug. 2003. The disclosures of these related patent applications are hereby incorporated by reference herein in their entirety and made a part hereof, including but not limited to those portions that specifically appear hereinafter.

FIELD OF THE INVENTION

This invention relates to a decorative laminate substrate that is coated with a self-adhesive layer of an adhesive material including an acrylic polymer. Furthermore, the invention concerns a method for the production of such a laminate.

BACKGROUND OF THE INVENTION

Laminated sheets (otherwise referred to as "laminate substrates") are generally used for decorative purposes in many areas of daily life. They are used, for example, in interior construction for the covering or lining of windows, stairs, and floors, and in the coating of furniture, both in the private as well as in the commercial sectors.

Laminated sheets often are made of cellulose sheets impregnated with curable synthetic resins and pressed with heat under high pressure. One or more sheets on one or two sheet sides exhibit decorative colors or decorations. Such laminated sheets (known as high pressure laminates or HPL) are sold, for example, by Resopal GmbH (a Wilsonart International company), under the tradename RESOPAL®.

The application of the laminated sheets on a carrier substrate such as chipboard, fireboard, or plywood used for wall, floor or ceiling finishes or other objects, can be done with an aqueous adhesive. Depending on the type of the adhesive, various conditions must be precisely maintained, so as to obtain a coating of good quality and stability. According to known application methods, the laminated sheets and the carrier are typically joined together after the application of the adhesive, immediately or after a short waiting time. The joining together is done according to the previous methods under a pressing pressure of 2 to 5 bar and at a temperature of up to 120° C.

Furthermore, the adhesive application is typically uniformly distributed over the laminated sheet and/or carrier surface, so as to avoid warp phenomena. This is particularly true for water-containing adhesive systems, in which the application quantity is to be kept as low as possible.

With a nonuniform adhesive application and an inexact maintenance of the pressing pressure, pressing temperature, and/or pressing time, unsatisfactory results can be obtained during the cementing. Thus, for example, excessively high temperatures can lead to warping and material damage. Low temperatures or pressures often result, on the other hand, in an insufficient adhesion. Depending on the adhesive system, the pressing pressure and the pressing temperature typically must be maintained between a few minutes and up to several hours. If necessary, one must wait overnight to obtain a final curing.

Working with solvent-containing contact adhesives generally requires adherence to work protection and accident prevention regulations. Furthermore, the use of solvent-containing adhesives is generally classified as problematic from a health and environmental policy viewpoint. The use of dispersion adhesives on a water basis, such as casein glue, frequently leads to the partial swelling of the carrier surface, which is frequently the case, for example, when using particleboard as the carrier material. As a result, a slightly corrugated or nonuniformly plane surface is obtained. Furthermore, the drying of water- or solvent-containing adhesives may require several hours.

Reaction adhesive, such as epoxide, polyesters, or polyurethane adhesives, are also of concern with respect to health and require a precise knowledge and maintenance of the processing conditions.

The previous adhesives and adhesive methods typically require a high equipment outlay, such as, for example, for the use of uniform and high pressing pressures and for the maintenance of the temperature. Depending on the adhesive, the curing, e.g., until a sufficient adhesive is attained, can require several hours.

The circumstances mentioned above often make the use and the successful processing of laminated sheets relatively difficult, particularly for the private sector or in the craftsman's sector. There is a need for an improved, efficient, safe, and less expensive decorative laminate panel.

SUMMARY OF THE INVENTION

A general object of this invention is to provide an improved adhesive-coated laminate substrate, particularly for use as a decorative or protective laminate covering for a material, such as wood, metal or mineral boards.

A more specific objective of this invention is to overcome one or more of the problems described above. In addition to the needs of the commercial sector, the needs of the private user with regard to a simple processing or application are considered and met.

Another object of this invention is to provide a decorative adhesive-coated laminate substrate, which adheres rapidly and firmly on a carrier substrate surface, without having to accept the long waiting times.

The rapid and firm adhesion of the laminate on the carrier can be achieved without the use and precise maintenance of high pressures or high temperatures during the application.

Another object of this invention is simplifying or eliminating the handling and application of the adhesive on the carrier. In particular, the difficulty of obtaining a uniform application of the adhesive on the carrier is avoided by instead uniformly applying the adhesive to the laminate substrate.

Furthermore, it is an object of this invention to provide a decorative laminate substrate that can be cemented without the use of water or solvents, and is as unobjectionable as possible from a health viewpoint and with regard to safety aspects.

Finally, it is an object of this invention to provide a decorative laminate substrate, which, after application on a carrier, provides a uniform planar surface.

The general object of the invention can be attained, at least in part, through an improved decorative laminate substrate coated with an adhesive layer. The adhesive layer may include a layer of a physically setting, solvent-free adhesive material including an acrylic polymer. The adhesive layer is self-adhesive at room temperature.

The invention further comprehends a laminate including a laminate substrate, a non-pressure sensitive adhesive layer applied to the laminate substrate, and a self-adhesive layer applied to the non-pressure sensitive adhesive layer. The non-pressure sensitive adhesive layer serves as a barrier layer (e.g. "primer") to prevent penetration of the self-adhesive layer into the laminate substrate, and to provide the laminate substrate with a primed surface. The self-adhesive layer includes a layer of a physically setting, solvent-free adhesive material comprising an acrylic polymer. The self-adhesive layer is self-adhesive at room temperature, meaning it does not require heat for activation, and may be manually activated upon contact with a carrier with or without pressure, or with light manual pressure.

The present invention also includes a method for the production of the laminate of this invention.

Furthermore, a composite material of a carrier and the adhesive-coated laminate substrate and the use of the adhesive-coated laminate substrate for the coating of carriers are provided.

A decorative laminate with an adhesive layer is made available, which is characterized in that the adhesive layer is a layer of a physically setting, solvent-free adhesive, which is self-adhesive at room temperature, wherein the laminated sheet has a peeling-off force of at least 0.2 N/mm$^2$ after the application on a carrier at room temperature. It is possible, in a manner which was not readily predictable, to make available a laminate, which quickly and firmly adheres on a carrier, without having to accept long waiting times.

Furthermore, the following advantages are attained by this invention. The application of the adhesive-coated laminate substrate on the carrier can be done without the use of high pressures and increased temperatures. A simple short pressing pressure, for example, manually, on the adhesive-coated laminate substrate is generally sufficient for immediate adhesion to the carrier. In addition, the adhesive-coated laminate substrate adheres stably on a carrier. Thus, one obtains, for example, a very high peeling-off force of the adhesive-coated laminate substrate from the carrier. Furthermore, a high peel resistance and a high static shearing strength are attained. Also with a temperature load of the composite of the adhesive-coated laminate substrate and carrier over a longer time, the adhesion remains stable and no peeling of the decorative adhesive-coated laminate substrate from the carrier appears. The adhesion characteristics, such as the peeling force, the shearing strength, and the peel resistance also are essentially retained with a temperature load. The previously mentioned characteristics are already attained with a small application quantity or layer thickness of the adhesive so that it can be used in a manner which saves material. Another advantage is to be found in that the adhesive application need not be undertaken by the end user himself. The reverse of the laminate substrate is already provided with the adhesive and can be immediately processed—that is, be applied on the carrier, without processing conditions of the adhesive, a uniform application, etc., having to be observed. The laminate substrate already provided with adhesive, in accordance with the invention, can be stored over a relatively long time. It is not necessary to apply the laminate substrate to the carrier immediately after application of the adhesive, as is typically the case with previous adhesive systems. The adhesive-coated laminate substrate of this invention provides a particularly uniform and planar surface after application on a carrier. In addition, the use of solvents and dispersants during the cementing of the plate, in accordance with the invention, can be dispensed with, which is particularly advantageous with regard to environmental and health aspects. Finally, the adhesive used, in accordance with the invention, contains only not very volatile plasticizers with a relatively low evaporation.

The previously mentioned advantages provide a relatively simple and easy to install adhesive-coated laminate substrate for the private user and the craftsman without mechanical equipment. The processing can be undertaken directly on site, without machines or special apparatuses having to be used for the processing. By the simple and rapid possibility of the application, the adhesive-coated laminate substrate in accordance with the invention is suitable, in particular, also, for the home user, to upgrade and cover furniture, door surfaces, walls, etc.

Other objects and advantages will be apparent to those skilled in the art from the following detailed description taken in conjunction with the appended claims.

DETAILED DESCRIPTION OF THE INVENTION

The present invention provides a decorative laminate substrate having a self-adhesive layer applied, either directly or indirectly, to one side of the laminate substrate. In one embodiment of this invention, the self-adhesive layer, at room temperature, includes a physically applied, solvent-free adhesive material including an acrylic polymer. The adhesive-coated laminate substrate of this invention provides improved bond strength or adhesion, temperature and humidity resistance, and adequate shear or creep resistance when bonded to a carrier. The adhesive-coated laminate substrate is relatively easily applied by the end user, as compared to typical known adhesive systems.

In accordance with the invention, "laminate substrate" includes materials such as, for example, glass fiber fabrics, paper, wood, textiles, plastic films, paper base laminates, laminated fabrics, laminated wood, which are produced by a buildup (the so-called laminating) of paper or fabric strips or glass fiber mats, soaked or coated with synthetic resins, such as epoxy, melamine resins, thermoplastics, phenoplastics, urea-formaldehyde resins, and by using pressure and heat. They are designated, in the state of the art, as "laminates" also, and are used in diverse embodiments, such as plates, round rods, tubes, long and construction molded articles, for many different uses, such as printed circuits, for aircraft, motor vehicle, boat construction, weather-resistant covers, sports gear (for example, skiers) and decorative purposes.

In one embodiment of this invention, the use of a high-pressure laminate ("HPL") as the laminate substrate has proved to be very particularly advantageous. The HPLs have layers of fibrous strips, preferably, paper, impregnated with curable resins, and optionally, one or more decorative layers, wherein the decorative layers are provided with decorative colors and/or patterns and preferably, are impregnated with resins on a melamine basis. The strips are bonded together under heat and high pressure of about 5 mPa or greater. In accordance with the invention, a continuously produced laminate (CPL) can also be used as the laminate substrate.

As will be appreciated by one skilled in the art following the teachings herein provided, various and alternative types, shapes, configurations of laminate substrates are available for use in the laminate of this invention. Such alternatives and details regarding the above materials can be found, for example, in the current technical literature, for example, "Ullmann's Encyclopedia of Industrial Chemistry," 4th Edition, Vol. 15, p. 326, and the norms DIN EN 438, Part 1 to Part 6, ISO 4586-1 and ISO 4586-2, each herein incorporated by reference in its entirety.

In one embodiment of this invention, the laminate substrate is a decorative high-pressure laminate preferably produced by a method in which fibrous strips are impregnated with at least a curable resin and then are pressed by the simultaneous use of heat, advantageously at a temperature in the range of about 120° C. to about 150° C., and at a pressure of at least 7 mPa, so that the resins initially flow and subsequently harden. A homogeneously closed material with an increased density, advantageously about 1.35 g/cm$^3$, and the desired surface characteristics is desirably obtained. Within the scope of this method, discontinuous multi-stage presses are used.

In another embodiment of this invention, a laminate substrate in which the fibrous strips are impregnated with heat-curable resins and then are continuously pressed on double-band presses at a high temperature, preferably, in the range of about 140 to about 200° C., has proved particularly advantageous. Such a method is particularly useful in producing continuously produced laminates (CPLs).

In another embodiment of this invention, a plastic laminate, in particular, polyester laminates made of paper strips, which are impregnated with at least one polyester resin, is used as a laminate substrate. One or both laminate sides thereby advantageously have a decorative paper, impregnated with polyester resin. The production of these polyester laminates advantageously takes place continuously.

The thickness of the laminate substrate of this invention can be selected freely, in principle, according to the field of application; it is generally in the range of 0.2 mm to 20 mm or 0.3 to 15 mm. More desirably, the thickness can also be in the range of 0.5 mm to 3.0 mm or in the range of 0.6 to 2.5 mm. In one embodiment, the thickness 0.6 to 1.6 mm is particularly desirable and 0.6 to 1.2 mm is even more desirable.

In one particularly preferred embodiment of this invention, a physically setting, solvent-free adhesive material is used to form a self-adhesive layer on at least one side of the laminate substrate. As used herein, "solvent-free" refers to an applied adhesive layer that contains no water and no organic liquids, which act as solvents or dispersants. In one embodiment, the self-adhesive layer is formed at least in part of an adhesive material including an acrylic polymer or copolymer.

In one particularly preferred embodiment of this invention, the adhesive includes a terpolymer of vinyl acetate-ethylene and acrylic. An example of such a terpolymer is available from Air Products and Chemicals, Inc., Allentown, Pa., and sold under the tradename FLEXBOND 153. Other FLEXBOND adhesives, such as, for example, FLEXBOND AF75 and FLEXBOND EAF60 are useful in forming laminates of this invention.

In one embodiment of this invention, the self-adhesive layer includes at least one elastomer, at least one not very volatile plasticizer, and at least one hydrocarbon resin. Additional component(s) of the adhesive layer can be a elastomeric components selected from the natural rubbers, polyisobutylene rubber, ethylene-propylene rubber (EPR), styrene-butadiene rubber, ethylene-propylene-diene-terpolymer rubber (EPDM), butyl rubber, ethylene-vinyl acetate copolymer, ethylene-(meth)acrylic acid copolymer, ethylene-(meth)acrylate copolymer, ethylene-(meth)acrylic acid-(methy)acrylate terpolymer, and acrylate rubbers. The elastomer can also be a block copolymer as described below. The elastomeric component(s) can be combined with the acrylic polymer, i.e. a polymer which includes an acrylic and/or acrylate group, e.g. the vinyl acetate-ethylene-acrylic terpolymer described above. Other elastomers may be combined with the acrylic polymer.

In one preferred embodiment of this invention, an additional elastomer is a high molecular weight polyisobutylene rubber with a number-average molecular weight of about 300,000-3,500,000 g/mol, desirably about 400,000-1,500,000 g/mol, and more desirably about 800,000 g/mol (according to GPC). The polyisobutylene rubber can be copolymerized with one or more comonomers, which are selected from styrene, ring-substituted styrenes, divinylbenzene, isoprene, indene, 1,3-butadiene, cyclopentadiene. The fraction of isobutene in the polyisobutylene rubber is desirably about 90%.

In one embodiment of this invention, the total weight fraction of the elastomer is about 10 to about 70 wt %, relative to the dry weight of the adhesive, and preferably about 30 to about 60 wt %. Of this amount, the acrylic polymer (e.g. the vinyl acetate-ethylene-acrylic terpolymer) should constitute at least about 10% by weight of the adhesive composition, and may constitute up to about 70% by weight depending on whether or not other elastomers are also present. The balance of the adhesive composition includes about 15-40% by weight of the plasticizer, about 15-30% by weight of the hydrocarbon resin, and about 0.01-2% by weight antioxidant.

The plasticizer can be a low-molecular weight polyisobutylene with a molecular weight of about 800 to about 5000 g/mol. The weight fraction of the low-molecular weight polyisobutylene can be about 18 to about 25 wt %, relative to the total weight of the adhesive.

In accordance with one embodiment of this invention, isobutylene polymers which can be used in the adhesive can be obtained from Bayer AG, under the tradenames BAYER BUTYL (a copolymer of isobutylene and isoprene) and POLYSAR BUTYL XL (a copolymer of isobutylene, isoprene, and divinylbenzene).

In accordance with one embodiment of this invention, block copolymers can be used as the elastomer which have at least two end blocks of a vinyl-aromatic monomer (block A) and at least one middle block (block B), which contains either a conjugated diene or is formed from an ethylene-butylene copolymer or an ethylene-propylene copolymer. The configuration can be linear, grafted, or star-shaped, depending on the method of production.

Typical block copolymers with the simplest conformation have the structure polystyrene-polybutadiene-polystyrene (SBS) or polystyrene-polyisoprene-polystyrene (SIS), or polystyrene-polyethylene/polybutylene-polystyrene. A typical radial or star polymer comprises one in which the B-block has three or four branches (radial) or more branches (star).

The end blocks A of the copolymer are formed from one or more vinyl-aromatic monomers, which are advantageously selected from styrene, ring-alkylated styrenes, such as alpha-methylstyrene and vinyltoluene, and polycyclic vinyl-aromatic compounds, such as vinylnaphthalene. Styrene and alpha-methylstyrene are preferred. Styrene is especially preferred. A block which is built as the end block A, can also be present, once or several times, in the middle of the polymer chain, in addition to being at the ends.

If the middle block B of the block copolymer contains a conjugated diene, it can be a homopolymer of a conjugated diene, a copolymer from several conjugated dienes, or a copolymer from a conjugated diene and a vinyl-aromatic compound, such as styrene or alpha-methylstyrene, as long as the conjugated diene predominates. The conjugated diene is preferably selected from a compound with 4-8 carbon atoms, such as butadiene, isoprene, 2,3-dimethyl-1,3-butadiene and piperylene, wherein butadiene and isoprene are preferred.

If block B contains a conjugated diene, it can be partially or completely hydrogenated. In addition, the A-blocks can also be partially or completely hydrogenated.

The average molecular weight of an A-block is about 5000-125,000 g/mol, and preferably about 6000-60,000 g/mol (weight average according to GPC). The average molecular weight of a B-block is about 10,000-300,000 g/mol and preferably about 30,000-150,000 g/mol (weight average according to GPC). The total weight of the block copolymer is desirably about 25,000 to about 350,000 g/mol, more desirably about 35,000-300,000 g/mol (weight average according to GPC). Advantageously, the fraction of the A-block is about 5-65 wt %, and more desirably about 35-50 wt %, relative to the block copolymer. Another advantageous range is about 5-30 wt %.

Details of the production of the aforementioned block copolymer can be found, for example, in the documents EP 0 537 115 A1 and U.S. Pat. Nos. 3,239,478; 3,427,269; 3,700,633; 3,753,936; and 3,932,327, the disclosure of each being herein incorporated by reference in its entirety.

The aforementioned polymers can be used individually or in combination with one another.

When used as an additional thermoplastic elastomer, the weight fraction of the block copolymer is desirably about 5-50 wt %, and more desirably about 10-40 wt %, relative to the total weight of the adhesive. A more desirable range of the weight fraction of the block copolymer is about 12-25 wt %, and more desirably about 15-20 wt %. Another advantageous range for some applications is about 30-40 wt %.

Exemplary block copolymers which can be used within the scope of one embodiment of this invention, without limitation, can be obtained, under the tradenames KRATON G1650, G1651, G1652, G1657, G4309 (linear styrene-ethylene/butylene-ethylene block copolymers of different block lengths), KRATON RP-6906, KRATON DX1122, AND KRATON D1118X. These polymers are available from Craton Polymers, LLC.

To build up the pronounced long-term tackiness, the adhesive, in one advantageous embodiment, contains synthetic plasticizers with a low volatility (evaporation loss or migration) at high temperatures (greater than about 120° C.).

The plasticizers contained in the adhesive are desirably synthetic plasticizers with a high boiling point and vapor pressure, which are not very volatile and exhibit an only slight evaporation from the adhesive.

Plasticizers are advantageously selected from mineral oils, paraffin oils, olefin oligomers, and polymers with lower molecular weights. As oligomers, one can use, for example, polypropylenes, polybutenes (e.g. the low molecular weight polyisobutylene described above), hydrogenated polyisoprenes, hydrogenated butadienes, etc., wherein the molecular weight is advantageously about 350 to about 10,000 g/mol.

The weight fraction of plasticizers is desirably about 0-40 wt %, and more desirably about 15-40 wt %, or about 15-30 wt %, relative to the total weight of the adhesive.

Furthermore, hydrocarbon resins can optionally be added to the adhesive, in order to attain a pronounced surface tackiness. The surface tackiness (tack) makes possible a pronounced tackiness in connection with low pressing forces during the assembly.

A group of the hydrocarbon resins (tackifiers), contained in the adhesive, desirably include natural and modified resins, such as, for example, gum resin, wood resin, tallow oil resin, distillate resin, and rosin, hydrogenated resin, dimerized resin, and polymerized resin.

Likewise, glycerol and pentaerythritol esters of natural and modified resins, such as the aforementioned, can be used.

Other resins which can be used in the adhesive as tackifiers are polyterpene resins, hydrogenated polyterpene resins, copolymers and terpolymers of natural terpenes, such as styrene/terpene, alpha-methylstyrene/terpene, and vinyltoluene/terpene. Also usable are phenol-modified terpene resins, which can be obtained, for example, by the condensation of a terpene and a phenol. Finally, aliphatic, cycloaliphatic, aromatic and aliphatic/aromatic resins based on petroleum can also be used as the hydrocarbon resin. Other resins which can be used in accordance with the invention and are known to the specialist are mentioned in the document EP 0 537 15 A1, the disclosure of which is herein incorporated by reference in its entirety.

The weight fraction of the hydrocarbon resin can be about 0-80 wt %, relative to the total weight of the adhesive, more desirably about 10-50 wt %, and even more desirably about 15-30 wt %.

In one embodiment of this invention, the self-adhesive layer and/or adhesive material can, optionally, contain common stabilizers, antioxidants, and other auxiliaries, fillers, and/or additives, known and available to those skilled in the art. Antioxidants can advantageously be selected from the hindered phenols and multifunctional phenols, such as sulfur- and phosphorous-containing phenols. An overview of such stabilizers and additives is given in the documents U.S. Pat. No. 6,143,818, and EP 0 537 115 A1, the disclosures of which are each incorporated by reference herein in their entirety. The weight fraction of stabilizers is desirably about 0.1-2 wt %, relative to the total weight of the adhesive, and preferably about 0.1-1 wt %.

The self-adhesive laminate of this invention desirably has a high tackiness, a strong immediate adhesion (tack), and also a high cohesion and good shear or creep resistance. As a result of the latter characteristics, the applied adhesive layer or the applied laminate can be loaded mechanically. Advantageously, in one embodiment of this invention, the applied adhesives are also resistant to water, weak acids, and alkalis. Using adhesive materials that are free of water or other solvents or dispersants means that with a carrier substrate having an absorbing capacity, they do not produce any swelling of the material due to the liquid. In one embodiment of this invention, the adhesives used are swell-free.

In one embodiment of this invention, those previously described adhesives are used, which have a solids content of about 100%, a density of about 1 $g/cm^3$ (at 20° C.), a viscosity at 160° C. of about 15,000-65,000 mPas, a processing temperature of 150-190° C., a softening point of about 90-135° C. (DIN 52011), a static shearing resistance at room temperature of about 5-15 kg (based on DIN EN 1943), a peeling-off resistance of about 35-65 N/25 mm (based on DIN EN 1939), and a shearing strength loss temperature (measurement method, see examples below), of about 60° C. to about 105° C., and more desirably about 65° C. to about 97° C.

In a particularly preferred embodiment of this invention, the adhesive layer applied on the laminated sheet is covered, for protection, with a release layer, which preferably is made, for example, of a siliconized paper or film. In this state, the sheet can be stored for a long time, desirably up to 12 months, without losing its adhesive characteristics or undergoing some appreciable decline.

The application quantity, or add-on level, of the previously described adhesive on the laminate substrate is generally about 80 to about 300 $g/m^2$, desirably about 140 to about 240 $g/m^2$, and more desirably about 150 to about 200 $g/m^2$. In one embodiment of the invention, the add-on level of the adhesive layer is from about 75 to about 150 $g/m^2$.

The layer thickness of the self-adhesive layer on the laminate substrate is generally about 0.05 to about 0.50 mm, or about 0.08 to about 0.30 mm, more desirably about 0.14 to about 0.24 mm, and particularly about 0.15 to about 0.20 mm. In one embodiment of the invention, the self-adhesive layer is about 0.175 mm thick. If both a self-adhesive layer and a non-pressure sensitive adhesive layer are used, each layer may have a thickness of about 0.125 mm. The adhesive layers can be applied using a roller coater or other suitable coating device. Each adhesive layer is desirably applied to the release layer or laminate substrate as a water-based emulsion; however, the adhesive layer can be applied using organic solvent-based emulsions or hot-melts. The adhesive layer is desirably applied to the release paper first, and then dried, although the adhesive layer can also be applied to the laminate substrate first. Upon application of the adhesive emulsion, the adhesive is dried, such as at 100° C. for 5 minutes, to form the applied solvent-free adhesive layer.

The pressing time upon application of the adhesive-coated laminate substrate is, in accordance with the invention, less than 5 seconds. Advantageously, a pressing time of 1 to 3 seconds is sufficient for bringing about an adhesion to the carrier with the mechanical characteristics mentioned in the following.

The necessary pressing pressure in the application of the adhesive-coated laminate substrate on the carrier surface is, in accordance with one embodiment of this invention, at most 2 bar. Desirably the needed pressing pressure is from about 0.2-1 bar and more desirably about 0.3-0.6 bar. In general, a light pressure, manually, is sufficient, in order to attain a complete adhesion. With larger surfaces, a uniform pressure using a roller is advantageous.

The application of the adhesive-coated laminate substrate of one embodiment of this invention is preferably carried out in the temperature range of about 5° C. to about 35° C. Advantageously, the adhesive-coated laminate substrate can be applied on a carrier at room temperature.

In one embodiment of this invention, the peeling-off force, which is needed to peel off the adhesive-coated laminate substrate applied on a carrier from the carrier, is at least about 0.2 $N/mm^2$. Desirably the peeling-off force is about 0.2 to about 2 $N/mm^3$, and more desirably about 0.5 to about 1.5 $N/mm^2$, and even more desirably about 0.8 to about 1.2 $N/mm^2$. These values of the peeling-off force are desirably attained when the adhesive-coated laminate substrate is applied at room temperature with the aforementioned pressing pressures, or by means of a light pressure, manually or with a roller. The peeling-off force is determined according to the method described in the European norm EN 311, herein incorporated by reference in its entirety.

Alternately, the peeling-off force can be increased in that the pressing pressure is increased above the aforementioned value ranges. This is, however, not necessary for the invention and can be optionally carried out, if desired.

Likewise, the peeling-off force of the adhesive-coated laminate substrate from the carrier can be increased in that the laminate substrate and the adhesive layer are heated shortly before or during the cementing on the carrier. This measure is not necessary and merely optional. Furthermore, the peeling-off force can be affected if the surface of the laminate substrate on which the adhesive is applied is roughened with the usual grinding agents before the application of the adhesive.

Finally, it can be advantageous but not necessary to pretreat the surface of the laminated substrate on which the adhesive is applied with the usual adhesion priming agents for adhesives, namely adhesion-imparting, preliminary paints or primers. Common adhesion priming agents include, for example, ethylene-acrylamide copolymers, polymeric isocyanates, and reactive silicon-organic compounds.

The adhesive-coated laminate substrate of one embodiment of this invention is characterized in that up to a temperature load of 80° C. over at least 2 hours, a peeling of the laminate substrate from a carrier material, in particular, from a particle board, does not appear. In particular, a peeling is not observed with a composite of the laminate, in accordance with the invention, and a carrier after at least a two-hour temperature load of about 50° C. to about 70° C. The adhesive-coated laminate substrate has been tested by introducing a sample laminate substrate applied on a carrier into a furnace at room temperature, which is filled with ambient air. This means that the air in the interior of the furnace has the same temperature and moisture content as the ambient air. Exemplary conditions are a temperature of about 20-23° C. and a relative humidity of 60-65% at the beginning of the test. Subsequently, the furnace is closed and heated to 80° C., and is maintained at this temperature for at least 2 hours.

The adhesive-coated laminate substrate of this invention can be applied on different types of carriers, wherein the type of carrier is not particularly limited. Preferred carrier materials are melamine-coated particle boards, carrier plates coated with laminate, chip board, medium-density fibrous plates, hard fibrous plates, plywood boards, veneer sheets, solid wood, honeycombs, foams, metal plates, sheet metal, mineral carriers, natural and synthetic rock, tiles, and gypsum plaster board.

This invention further contemplates and includes a composite material, which comprises one of the previously mentioned carriers and an adhesive-coated laminate substrate which adheres to the carrier. The laminate substrate can advantageously be applied both on liquid-absorbing (absorbent) carriers, such as uncoated particle boards and uncoated wood, as well as on non-liquid-absorbing (nonabsorbent) carriers, such as metals, ceramic, glass, coated woods, coated particle boards etc.

The composite of one embodiment of this invention is characterized by a uniform and planar surface on the sides of the applied laminate substrate. Thus, the maximum height difference on the sides of the decorative layer is about 0.05-0.5 mm, and more desirably about 0.05-0.2 mm. The uniformity can easily be determined, in actual practice, by visual inspection, such as by the undistorted reflection of a light source (for example, neon tube) on the surface of the laminate substrate applied on the carrier.

The adhesive-coated laminate substrate applied, in accordance with one embodiment of this invention, on a carrier generally has a more uniform and more planar surface, as compared to laminate substrates applied using conventional methods/adhesives on carriers.

Particularly advantageous, this characteristic manifests itself, if the adhesive-coated laminate substrate is applied on an absorbent or liquid-absorbing carrier. In this case, the laminate substrate forms a more uniform and more planar surface than a sheet that was applied with a solvent- or dispersant-containing adhesive.

In another aspect, the invention under consideration concerns the use of the previously described adhesive-coated laminate substrate for the coating of a carrier material which is preferably selected from the previously mentioned carrier materials. The used carrier can be both liquid-absorbing (absorbent) and also non-liquid-absorbing.

Likewise, the invention concerns the use of the composite of the carrier material and the adhesive-coated laminate substrate in interior and outside construction, such as for the covering of walls, ceilings, and doors, and for the production and covering of furniture and pieces of furniture.

Due to the previously described adhesion characteristics of the adhesive-coated laminate substrate on the carrier material, especially on particle boards, and the peeling-off resistance with a temperature load, the composite is also suitable for the production of pieces of furniture which are temporarily exposed to high temperatures, such as kitchen work plates.

The invention also provides a production method for a decorative laminate substrate with a self-adhesive layer. The method of one embodiment of this invention is characterized in that an adhesive material is applied on a laminate substrate at a temperature of 150-190° C., advantageously on the reverse side opposite from the decorative side or layer, and is subsequently allowed to cool.

Advantageously, the adhesive is desirably applied on a continuously advanced laminate with a stationary roller or nozzle. The adhesive application rate on the laminate is desirably about 1 to 30 m/min.

The adhesive is preferably applied in a quantity of about 80 to about 300 g/m$^2$, desirably about 140 to about 240 g/m$^2$, and more desirably about 150 to about 200 g/m$^2$, on the laminate substrate.

The applied adhesive is advantageously covered with a release layer, which advantageously is made of a siliconized paper or a siliconized film.

In another embodiment of this invention, the laminate substrate has two different adhesive layers applied thereon. A non-pressure sensitive adhesive layer is first applied to one side of the laminate substrate and a self-adhesive layer is applied to the non-pressure sensitive adhesive layer, and thereby indirectly applied to the laminate substrate. The self-adhesive layer includes a layer of a physically setting, solvent-free adhesive material comprising an acrylic polymer. The self-adhesive layer is desirably self-adhesive at room temperature. A release layer, such as a release paper or film, is desirably applied over the self-adhesive layer to maintain the adhesive properties or tackiness until use.

The self-adhesive layer desirably includes a terpolymer of vinyl acetate-ethylene and acrylic. The non-pressure sensitive adhesive layer comprises an adhesive material having a glass transition temperature of about 20° C. or greater. The non-pressure sensitive layer desirably functions as a barrier layer or primer separating the self-adhesive layer from the laminate substrate. The barrier provided by the non-pressure sensitive adhesive desirably reduces or eliminates penetration of the self-adhesive into the laminate substrate. In one embodiment of his invention, the non-pressure sensitive adhesive is, for example, polyvinyl acetate. The non-pressure sensitive adhesive layer may also be an acrylic primer as described below.

In one embodiment of this invention, the non-pressure sensitive adhesive layer has an add-on level of about 10 to about 30 g/m$^2$, and the self-adhesive layer has an add-on level of about 75 to about 100 g/m$^2$. The non-pressure sensitive adhesive is desirably applied to the laminate substrate and subsequently at least partially cured or dried before the self-adhesive layer is applied over the applied non-pressure sensitive adhesive. The layer of non-pressure sensitive adhesive desirably provides improved temperature resistance and extends the shelf life of the laminate before the final use or application to the carrier. Both the self-adhesive layer and the non-pressure sensitive adhesive layer can be applied as, for example, a water-based emulsion, a solvent-based emulsion, or a hot melt.

The adhesive-coated laminate substrate may be prepared by the following method. First, a release layer is coated with a layer of physically setting, solvent-free adhesive which includes an acrylic polymer. This may be accomplished by initially coating the release layer with an aqueous or other solvent-based acrylic adhesive, suitably containing about 35-75% by weight, or about 45-65% by weight adhesive solids. The water or other solvent is then removed by evaporation at about 30-150° C., suitably about 75-120° C. for a time of 1-15 minutes, or about 3-8 minutes, sufficient to cause drying. The adhesive layer may have a dry thickness of about 50-500 microns, or about 80-300 microns, and a wet thickness perhaps twice as large.

A suitable release layer is a silicone-coated paper, Type 402-6010, available from Wausau Paper Co. of Rhinelander, Wis. Various other plastic-coated papers and plastic films can also be employed as release layers. The adhesive layer may be thermoplastic or thermosetting, and is suitably thermoplastic. Suitable adhesive polymers include without limitation acrylic polymers, copolymers and terpolymers as described above.

Second, the adhesive can be applied to a surface of the laminate substrate by overlaying the adhesive-coated release layer on the laminate substrate with the adhesive side facing the laminate substrate. If the laminate substrate is a cellulose-based high pressure laminate, or another laminate having a relatively smooth surface, it may be desirable not to sand the surface or otherwise increase its roughness prior to applying the adhesive. The solvent-free adhesive is relatively viscous or solid and will not easily penetrate into the valleys and crevices which are present in a rough surface. When the laminate substrate surface is relatively smooth, the adhesive may establish contact over the entire surface, resulting in better adhesion.

Alternatively, the surface of the laminate substrate may be both sanded and primed before applying the adhesive. The sanding creates a rough surface having valleys and crevices which are filled by coating with a suitable primer. Suitable primers include easy drying, solvent-based primers having polymer components which are compatible with the adhesive to be applied. For instance, an acrylic-based primer dries to form an acrylic-based smooth surface which has excellent affinity to an acrylic-based adhesive layer. One suitable polyolefin-based primer contains about 50% by weight solids and is sold by Lord Chemlok under the trade name 459X. The primer coating may have a dry thickness of about 10-50 microns, or about 15-40 microns, and a wet thickness perhaps twice as large. Once the primer is dried, the adhesive is applied to the primed surface of the laminate substrate.

Third, pressure is applied to the release layer to press the adhesive onto the surface of the laminate substrate. A suitable pressure is between about 3-70 N/cm$^2$, suitably about 10-50 N/cm$^2$. Once the adhesive has been pressed onto the laminate substrate, the release layer is manually peelable to expose the adhesive. For instance, the release layer can be manually peeled away and the adhesive layer can be used to bond the laminate substrate to a wall, floor, counter top, or other surface.

Figure 1:
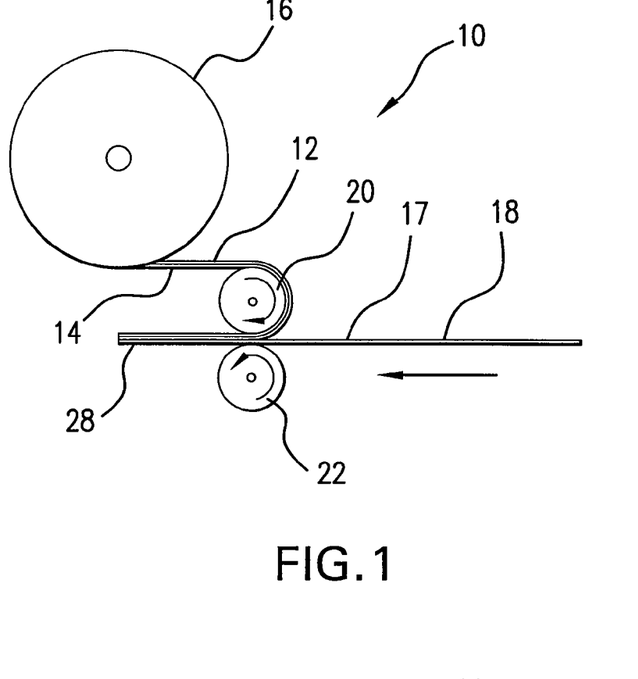
FIG. 1 schematically illustrates a process for preparing an adhesive-coated laminate substrate of the invention.

FIG. 1 schematically illustrates an exemplary process 10 useful for coating the adhesive layer onto the laminate substrate. An adhesive layer 12, combined with a release layer 14, are unwound from a roll 16. The foregoing layers are brought together with laminate substrate 18 in a nip defined by nip rolls 20 and 22, with the adhesive layer 12 facing the surface 17 of laminate substrate 18. Typically, laminate substrate 18 is positioned so that the surface 17 is its back surface, i.e. the surface used to bond adhesive-coated laminate substrate 28 to a wall, floor or object.

Figure 2:
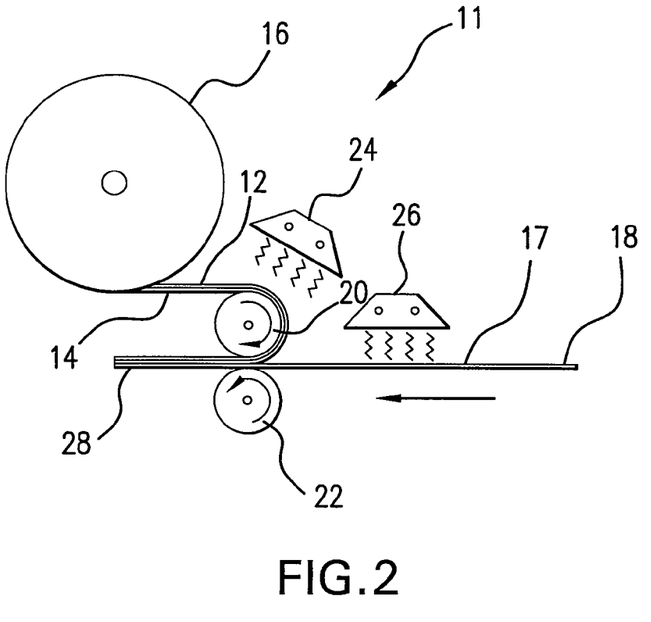
FIG. 2 schematically illustrates an alternative process for preparing an adhesive-coated substrate laminate of the invention.

FIG. 2 schematically illustrates an alternative process 11 which is similar to process 10 except for the presence of heaters. The adhesive layer 12 may be heated using an external infrared heater 24 and/or an internal heater (not shown) inside roll 20, before the adhesive layer 12 is applied to and pressed onto the surface 17 of laminate substrate 18. Alternatively, or additionally, the laminate substrate 18 may be heated using infrared heater 26 before the adhesive layer 12 is applied. In either case, the heating may result in a temperature of about 30-120° C., suitably 50-80° C., which is high enough to soften the adhesive layer 12 and impart a better adhesive bond to the laminate substrate 18. The release layer 14 can still be peelably removed to allow bonding of adhesive-coated laminate substrate 28 to an object.

Examples of embodiments of this invention are described below, which, in no way, represent a limitation of the inventive idea.

1. Production of an Adhesive-Coated Laminate Substrate

All data refer to the weight.

From a supply container heated to 180° C., an adhesive based on 25% SIS, 15% SBS, and 60% hydrocarbon resin (with a content of 10% polybutene), was conducted onto a roller with a width of 60 cm and heated to 180° C. The thermoplastically liquified adhesive was conveyed via the roller and applied onto an HPL sheet, which was advanced with the roller at 15 m/min, wherein the gap between the roller and the HPL sheet was 3 mm, and the adhesive was applied in a quantity of 180 g/m$^2$. A siliconized paper was applied for protection to the adhesive layer that was still warm. Subsequently, the HPL sheet coated with the adhesive was allowed to cool.

2. Application of the Adhesive-Coated Laminate Substrate on a Carrier Material

The above adhesive-coated laminate substrate was applied, at room temperature, on a carrier. The laminate, whose adhesive layer was covered with a siliconized release paper, is first aligned on the carrier. Subsequently, the release paper was pulled away, partially at an edge, preferably on the narrow edge, and the adhesive-coated laminate substrate was pressed on the carrier at the edge with the exposed adhesive layer. Then, the release paper was drawn out, step by step, under the adhesive-coated laminate substrate and the laminate substrate is pressed, manually, on the carrier. Advantageously, the adhesive-coated laminate substrate can be pressed uniformly on the carrier substrate with a hard rubber roller. A subsequent processing of the edges can be done with the usual doctors, files, cutters, and grinders.

3. Mechanical Characteristics of the Composite Material

Peeling-Off Resistance

Measurement values for the peeling-off resistance of a self-adhesive HPL, in accordance with the invention, on various substrates, are shown below.

The determination of the peeling-off resistance is made according to EN 311. The pressing of the adhesive-coated laminate substrate on the carrier is carried out by light pressing manually or with a roller.

| Carrier material | Peeling-off resistance (N/mm$^2$) |
|---|---|
| Melamine-faced chipboard | 0.7-1.5 |
| Wood materials (particle board, plywood, multiplex, MDF), precoated with laminated sheets (HPL + CPL) | 0.7-1.5 |
| Uncoated wood materials (particle board, plywood, multiplex, MDF) | 0.5-1.0 |
| Polystyrene foam | 0.2-0.5 |
| Gypsum particle board | 0.2-0.5 |
| Expanded mica plates | 0.2-0.5 |
| Aluminum, aluminum honeycombs | 0.2-0.5 |

All measurement values given above are based on roughened HPL sheets. A smooth HPL surface may result in somewhat higher peel resistance than a roughened surface if the adhesive is applied to the HPL surface in a dry state from a release layer, or somewhat lower peel resistance if the adhesive is applied to the HPL surface in a wet state.

Measurement of the Sheet Strength Loss Tempering

A laminate substrate with an adhesive layer according to one embodiment of this invention was cut to a size of 25 mm in width and 70 mm in length. The test piece was applied on a carrier in such a way that there was an overlapping of the adhesive area in the longitudinal direction of 25 mm. On the free, lower end of the test piece, a weight of 500 g was affixed. Subsequently, the test setup was introduced into a furnace that was preheated to 40° C. and left there at 40° C. for 30 min. Then, the furnace was heated at a heating rate of 0.37° C. per minute until the test piece detached from the carrier.

Shear resistance loss temperatures between 60° C. and 105° C. were measured with adhesive-coated laminated sheets, in accordance with the invention.

Further laminate samples (12.7 cm×20.3 cm) were prepared using:

1) FLEXBOND 153 to form a self-adhesive layer; and 2) FLEXBOND 153 to form a self-adhesive layer and polyvinyl acetate to form a non-pressure sensitive adhesive layer. The laminate samples were applied to a chip board and/or melamine carrier and subjected to testing. The adhesive layers were applied at about 5 mils (127 microns) and dried at 100° C. for 5 minutes.

The samples demonstrated temperature resistance upon application to a carrier by maintaining adhesion and laminate integrity to beyond 80° C. The samples were placed in an oven at 60° C. and the temperature was raised ten degrees every two hours until delamination was observed.

The samples each further demonstrated a desirable long-term shelf life by maintaining laminate integrity at 75° C. beyond 1.5 months.

The samples demonstrated humidity resistance by maintaining laminate integrity for over 14 days at 65° C. and a 95% humidity level.

The samples further demonstrated desirable shear strength by having a peeling-off force of over 0.2 N/mm² (e.g., about 0.26 and 0.35 N/mm², respectively). The determination of the peeling-off resistance was accomplished according to EN 311. The pressing on the substrate is carried out by light pressing manually or with a roller.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A high pressure decorative laminate, comprising in adjacent sequence:
   a hardened high pressure decorative laminate substrate having a homogeneously closed structure and a density not less than about 1.35 grams per cubic centimeter, consisting of layers of fibrous strips impregnated with a cured resin and one or more decorative paper layers impregnated with a resin;
   an adhesive layer including a physically setting, solvent-free terpolymer of vinyl acetate-ethylene and acrylic, positioned adjacent to the hardened high pressure decorative laminate substrate; and
   a release layer including a siliconized paper or film positioned adjacent to the adhesive layer.

2. The high pressure decorative laminate of claim 1, wherein the adhesive layer is self-adhesive at room temperature.

3. The high pressure decorative laminate of claim 1, wherein the cured resin comprises at least one of a melamine resin, an epoxy resin, a phenoplastic, and a urea-formaldehyde resin.

4. The high pressure decorative laminate of claim 3, wherein the cured resin comprises a melamine resin.

5. The high pressure decorative laminate of claim 1, wherein the fibrous strips comprise cellulose strips.

6. The high pressure decorative laminate of claim 1, wherein the adhesive layer comprises a non-pressure sensitive adhesive layer adjacent to the hardened high pressure decorative laminate substrate and a self-adhesive layer adjacent to the non-pressure sensitive adhesive layer, the self-adhesive layer including the physically setting, solvent-free terpolymer of vinyl acetate-ethylene and acrylic.

7. The high pressure decorative laminate of claim 6, wherein the self-adhesive layer further comprises an elastomer.

8. The high pressure decorative laminate of claim 7, wherein the elastomer comprises high molecular weight polyisobutylene rubber having a number-average molecular weight of about 300,000 to about 3,500,000 grams/mol.

9. The high pressure decorative laminate of claim 6, wherein the non-pressure sensitive adhesive layer comprises polyvinyl acetate.

10. The high pressure decorative laminate of claim 1, wherein the layers of fibrous strips impregnated with a cured resin are bonded together under heat and high pressure of about 5 mPa or greater.

11. The high pressure decorative laminate of claim 10, wherein the fibrous strips impregnated with a cured resin are bonded together at a temperature of about 120° C. to about 150° C. and a pressure of about 7 mPa or greater.

12. The high pressure decorative laminate of claim 1, wherein the adhesive layer comprises, based on dry weight, about 10 to about 70% by weight of an elastomer, about 10 to about 70% by weight of the terpolymer of vinyl acetate-ethylene and acrylic, about 15 to about 40% by weight of a plasticizer, and about 15 to about 30% by weight of a hydrocarbon resin.

13. The high pressure decorative laminate of claim 12, wherein the plasticizer comprises a low molecular weight polyisobutylene having a molecular weight of about 800 to about 5000 grams/mol.

14. The high pressure decorative laminate of claim 12, wherein the elastomer comprises a block copolymer having two end blocks of a vinyl aromatic monomer and at least one middle block that contains a conjugated diene or is formed from an ethylene-butylene copolymer or an ethylene-propylene copolymer.

15. The high pressure decorative laminate of claim 14, wherein the end blocks have a molecular weight of about 6000 to about 60,000 grams/mol and the middle block has a molecular weight of about 30,000 to about 150,000 grams/mol.

16. The high pressure decorative laminate of claim 12, wherein the hydrocarbon resin is selected from the group consisting of gum resin, wood resin, tallow oil resin, distillate resin, hydrogenated resin, dimerized resin, polymerized resin, and combinations thereof.

* * * * *